US011407156B1

(12) United States Patent
Tseng et al.

(10) Patent No.: US 11,407,156 B1
(45) Date of Patent: Aug. 9, 2022

(54) MOLDING SYSTEM FOR PREPARING AN INJECTION-MOLDED ARTICLE

(71) Applicant: CORETECH SYSTEM CO., LTD., Zhubei (TW)

(72) Inventors: Huan-Chang Tseng, Zhubei (TW); Rong-Yeu Chang, Zhubei (TW); Chia-Hsiang Hsu, Zhubei (TW)

(73) Assignee: CORETECH SYSTEM CO., LTD., Zhubei (TW)

( * ) Notice: Subject to any disclaimer, the term of this patent is extended or adjusted under 35 U.S.C. 154(b) by 15 days.

(21) Appl. No.: 17/371,883

(22) Filed: Jul. 9, 2021

Related U.S. Application Data

(60) Provisional application No. 63/177,679, filed on Apr. 21, 2021.

(51) Int. Cl.
*B29C 45/76* (2006.01)
*B29C 45/03* (2006.01)

(52) U.S. Cl.
CPC ............. *B29C 45/76* (2013.01); *B29C 45/03* (2013.01); *B29C 2945/76936* (2013.01)

(58) Field of Classification Search
CPC .................... B29C 45/76; B29C 45/03; B29C 2945/76936
See application file for complete search history.

(56) References Cited

U.S. PATENT DOCUMENTS

| 10,377,066 | B1 * | 8/2019 | Tseng | ............... B29C 45/77 |
| 10,703,030 | B1 * | 7/2020 | Tseng | ............. B29C 45/0001 |
| 10,710,285 | B1 | 7/2020 | Tseng et al. | |
| 2019/0232535 | A1 * | 8/2019 | Tseng | ............... B29C 45/77 |

OTHER PUBLICATIONS

Bird RB, Wiest JM. Constitutive equations for polymeric liquids. Annu Rev Fluid Mech 1995; 27 169-193.
Rong-Yeu Chang and Wen-hsien Yang, "Numerical simulation of mold filling in injection molding using a three-dimensional finite volume approach," International Journal for Numerical Methods in Fluids vol. 37, Issue 2, pp. 125-148, Sep. 30, 2001.
(Continued)

*Primary Examiner* — Yunju Kim
(74) *Attorney, Agent, or Firm* — Muncy, Geissler, Olds & Lowe, P.C.

(57) ABSTRACT

The present disclosure provides an injection-molding system for preparing an injection-molded article using a computer-aided engineering (CAE) simulation. The molding system includes a molding machine; a mold disposed on the molding machine and having a mold cavity for being filled with a molding resin; a processing module configured to generate a stress distribution of the molding resin in the mold cavity based on a molding condition for the molding machine, wherein the stress distribution of the molding resin is generated by taking into consideration an elastic effect of the molding resin; and a controller coupled to the processing module and configured to control the molding machine with the molding condition using the generated stress distribution of the molding resin to perform an actual molding process for preparing the injection-molded article.

15 Claims, 6 Drawing Sheets

(56) References Cited

OTHER PUBLICATIONS

Cross, M. M., "Relation between Viscoelasticity and Shear-Thinning Behaviour in Liquids," Rheol Acta 18 609-614 (1979).
Sarkar, D. and M. Gupta, "Further Investigation of the Effect of Elongational Viscosity on Entrance Flow," J Reinf Plast Compos 20 1473-1484 (2001).
Schmidt, M., E. Wassner, and H. Münstedt, "Setup and Test of a Laser Doppler Velocimeter for Investigations of Flow Behaviour of Polymer Melts," Mech Time-Depend Mater 3 371-393 (1999).
Tseng, H.-C., "A Revisitation of Generalized Newtonian Fluids," J Rheol 64 493-504 (2020).

* cited by examiner

MOLDING SYSTEM FOR PREPARING AN INJECTION-MOLDED ARTICLE

CROSS-REFERENCE TO RELATED APPLICATION

This patent application claims priority under 35 U.S.C. § 119(e) from Provisional Patent Application No. 63/177,679, filed on Apr. 21, 2021, the disclosure of which is incorporated by reference herein in its entirety, including all exhibits appended to Provisional Patent Application No. 63/177,679.

TECHNICAL FIELD

The present disclosure relates to a molding system for preparing an injection-molded article, and more particularly, to an injection-molding system for preparing an injection-molded article using a computer-aided engineering (CAE) simulation.

DISCUSSION OF THE BACKGROUND

In plastics manufacturing, the actual flow of polymer melts is transient, non-Newtonian and non-isothermal, with frozen layers building up as the complex mixture flows through the mold cavity. Characteristics of a finished product are determined by many complex factors, such as changes in the direction of flow, inclusion of ribs, and changes in thickness and holes. To control the quality of the products, a deep understanding of complicated flow fields is critical. Nowadays, CAE (computer-aided engineering) software provides realistic simulation and predictive analysis for complex flows of complex fluids.

According to results of academic research of fluid mechanics and rheology, a strain rate that indicates a rate of deformation of a material with respect to time plays an essential role in the physics of fluids. Strain includes both shear and extension deformations. As a rule, both have been investigated separately.

In practice, a complex geometric channel flow is a combination of shear flow and extension flow. For the complex flow, a generalized strain rate that can be determined with certainty is widely applied in the CAE tool. Flows in injection molding are dominated by shear flows, but extension flows are encountered, such as the contraction flow at gate and nozzle regions, and the fountain flow of a melt front in the cavity. However, the generalized strain rate is not decomposed into individual rates of shear and extension. To resolve such significant issue, the present disclosure proposes the principal shear rate and the principal extension rate to be obtained from the generalized strain rate. In addition, a new quantity is defined to show the degree of shear and extension variance with respect to flow geometric features. This is based on extensive research of complicated flow phenomena related to shear and extension.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One embodiments of the present disclosure provides a molding system for preparing an injection-molded article, comprising a molding machine; a mold disposed on the molding machine and having a mold cavity for being filled with a molding resin; a processing module configured to generate a stress distribution of the molding resin in the mold cavity based on a molding condition for the molding machine, wherein the stress distribution of the molding resin is generated by taking into consideration an elastic effect of the molding resin; and a controller coupled to the processing module and configured to control the molding machine with the molding condition using the generated stress distribution of the molding resin to perform an actual molding process for preparing the injection-molded article.

Another embodiments of the present disclosure provides a method for preparing an injection-molded article, comprising: disposing a mold on a molding machine, the mold having a mold cavity for being filled with a molding resin; generating, by a processing module, a stress distribution of the molding resin in the mold cavity based on a molding condition for the molding machine, wherein the stress distribution of the molding resin is generated by taking into consideration an elastic effect of the molding resin; controlling, by a controller coupled to the processing module, the molding machine with the molding condition using the generated stress distribution of the molding resin to perform an actual molding process for preparing the injection-molded article.

In some embodiments, the molding resin comprises a plurality of polymer chains, and the elastic effect of the molding resin is integrally generated by a deformation and a rotation of polymer chains.

In some embodiments, the elastic effect of the stress distribution of the molding resin is represented using an expression:

$$\tau_E = 2W_i[(\tau \cdot W^*)_R + C_N(\tau \cdot D^*)_S]$$

$$D^* = D/\dot{\gamma}$$

$$W^* = W/\dot{\gamma}$$

$$(\tau \cdot W^*)_R = \frac{\tau \cdot W^* + W^{*T} \cdot \tau}{2}$$

$$(\tau \cdot D^*)_S = \frac{\tau \cdot D^* + D^* \cdot \tau}{2}$$

$$W_i(\dot{\gamma}) = \frac{W_0}{\left[1 + \left(\frac{\dot{\gamma}}{\dot{\gamma}_{CW}}\right)^{-2}\right]^{n_W}}$$

$$C_N(\dot{\gamma}) = 1 - 2\left[R_0 + \frac{0.5 - R_0}{\left[1 + \left(\frac{\dot{\gamma}}{\dot{\gamma}_{CR}}\right)^2\right]^{n_R}}\right]$$

where $\tau$ represents the stress distribution of the molding resin; $\tau_E$ represents an elastic portion of the stress distribution of the molding resin; D and W represents a rate-of-deformation distribution and a vorticity distribution of the molding resin, respectively; $\dot{\gamma}$ represents a total strain rate distribution of the molding resin; $\tau \cdot W^*)_R$ and $(\tau \cdot D^*)_S$ represent a rotating and a stretching of the molding resin, respectively; $W_i(\dot{\gamma})$ and $C_N(\dot{\gamma})$ represents a viscoelastic property and a normal-stress parameter of the molding resin, respectively.

In some embodiments, the viscoelastic property of the molding resin is represented using an expression:

$$W_i(\dot{\gamma}) = \frac{W_0}{\left[1+\left(\frac{\dot{\gamma}}{\dot{\gamma}_{CW}}\right)^{-2}\right]^{n_W}}$$

$$C_N(\dot{\gamma}) = 1 - 2\left[R_0 + \frac{0.5 - R_0}{\left[1+\left(\frac{\dot{\gamma}}{\dot{\gamma}_{CR}}\right)^2\right]^{n_R}}\right]$$

Where $W_0$, $\dot{\gamma}_{CW}$, and $n_W$ are fit by the experimental data of the first normal stress difference; $R_0$, $\dot{\gamma}_{CR}$, and $n_R$ are fit by the experimental data of the minus ratio of the second normal stress difference to the first normal stress difference.

In some embodiments, the processing module is further configured to generate the stress distribution of the molding resin by taking into consideration a mixed anisotropic viscosity distribution of the molding resin.

In some embodiments, the stress distribution of the molding resin is represented using an expression:

$$\tau = \tau_V^{GNF-X} + \tau_E$$

$$\tau_V^{GNF-X} = 2\eta_M D$$

$$\tau_E = 2W_i[(\tau \cdot W^*)_R + C_N(\tau \cdot D^*)_S]$$

where $\tau_V^{GNF-X}$ represents a mixed anisotropic stress distribution of the molding resin, and $\eta_M$ represents a mixed anisotropic viscosity distribution of the molding resin.

In some embodiments, the mixed anisotropic viscosity distribution of the molding resin is generated by taking into consideration an extension rate distribution and a shear rate distribution of the molding resin, and the extension rate distribution is generated by an interaction of the plurality of polymer chains In some embodiments, the mixed anisotropic viscosity distribution of the molding resin is represented using an expression:

$$\eta_M = \eta_S\left[1 + (R_{TR})\frac{(\dot{\gamma}_E^*)^2}{(\dot{\gamma})^2}\right]$$

$$R_{TR}(\dot{\gamma}) = \frac{\eta_E}{\eta_S} = N_1 + \frac{N_2}{[1+(\lambda\dot{\gamma})^{n_1}]^{n_2}}$$

$$\dot{\gamma}^2 = (\dot{\gamma}_S^*)^2 + (\dot{\gamma}_E^*)^2$$

where $\eta_M$ represents the mixed anisotropic viscosity distribution, $\eta_S$ represents a shear viscosity distribution, $\eta E$ represents an extension viscosity distribution, $N_1$, $N_2$, $n_1$, $n_2$, and $\lambda$ are constants, $\dot{\gamma}_S^*$ represents the shear rate distribution of the molding resin, and $\dot{\gamma}_E^*$ represents the extension rate distribution of the molding resin.

In some embodiments, the processing module is configured to generate the extension rate distribution and the shear rate distribution of the molding resin based in part on consideration of a velocity distribution of the molding resin in the mold cavity.

In some embodiments, the processing module is configured to generate the extension rate distribution and the shear rate distribution of the molding resin in a principal flow streamline coordinate system, and generate the velocity distribution of the molding resin in the mold cavity in a Cartesian coordinate system.

In some embodiments, the processing module is configured to generate a rate-of-deformation distribution of the molding resin in the Cartesian coordinate system based in part on consideration of the velocity distribution due to a geometry variation of the mold cavity.

In some embodiments, the processing module is configured to transform the rate-of-deformation distribution of the molding resin in the Cartesian coordinate system into a rate-of-deformation distribution of the molding resin in the principal flow streamline coordinate system.

In some embodiments, the rate-of-deformation distribution of the molding resin in the Cartesian coordinate system is represented by an expression:

$$D = \begin{bmatrix} d_{11} & d_{12} & d_{13} \\ d_{12} & d_{22} & d_{23} \\ d_{13} & d_{23} & d_{33} \end{bmatrix}$$

wherein the processing module is configured to generate the rate-of-deformation distribution of the molding resin in the principal flow streamline coordinate system by an expression:

$$D^* = RDR^T = \begin{bmatrix} d_{11}^* & d_{12}^* & d_{13}^* \\ d_{12}^* & d_{22}^* & d_{23}^* \\ d_{13}^* & d_{23}^* & d_{33}^* \end{bmatrix}$$

where $R$ and $R^T$ represent coordinate transfer matrixes represented by an expression:

$$R = \begin{bmatrix} t \\ n \\ b \end{bmatrix}$$

$$RR^T = R^TR = I = \begin{bmatrix} 1 & 0 & 0 \\ 0 & 1 & 0 \\ 0 & 0 & 1 \end{bmatrix}$$

where t is a unit tangent vector, n is a unit normal vector, and b is a unit bi-normal vector.

In some embodiments, the unit tangent vector t, the unit normal vector n, and the unit bi-normal vector b are represented by an expression:

$$t = \frac{v}{|v|}$$

$$n = \frac{dv/ds}{|dv/ds|}$$

$$b = t \times n$$

where v is a flow velocity vector indicating the tangent direction of the flow line, and dv/ds is a direction of velocity changes along the arc of the flow line.

In some embodiments, the processing module is configured to divide the rate-of-deformation distribution of the molding resin in the principal flow streamline coordinate system into the extension rate distribution and the shear rate distribution of the molding resin represented by an expression:

$$D^* = S^* + E^*$$

-continued $$S^* = \begin{bmatrix} 0 & d_{12}^* & d_{13}^* \\ d_{12}^* & 0 & d_{23}^* \\ d_{13}^* & d_{23}^* & 0 \end{bmatrix}$$

$$E^* = \begin{bmatrix} d_{11}^* & 0 & 0 \\ 0 & d_{22}^* & 0 \\ 0 & 0 & d_{33}^* \end{bmatrix}$$

$$\dot{\gamma}_S^* = \sqrt{2S^* : S^*}$$

$$\dot{\gamma}_E^* = \sqrt{2E^* : E^*}$$

$$\dot{\gamma}^2 = (\dot{\gamma}_S^*)^2 + (\dot{\gamma}_E^*)^2$$

where $\dot{\gamma}$ represents a total strain rate distribution of the molding resin, $\dot{\gamma}^*_S$ represents the shear rate distribution, and $\dot{\gamma}^*_E$ represents the extension rate distribution.

In some embodiments, the processing module is configured to generate an extension fraction (EF) indicator represented by an expression:

$$EF = \frac{(\dot{\gamma}_E^*)^2}{(\dot{\gamma}_S^*)^2 + (\dot{\gamma}_E^*)^2}$$

In some embodiments, the processing module is configured to generate the extension rate distribution and the shear rate distribution of the molding resin based in part on consideration of a rate-of-deformation distribution of the molding resin due to the geometry variation of the mold cavity.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system for preparing an injection-molded article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Polymers/Plastics applications can be found in almost all areas of everyday living due to their versatility with an economically attractive choice in the manufacturing industry. Dominating the details of flow field of polymer melts is important for the manufacturing plastics, especially for the viscous flow curve. Viscoelasticity (VE) is a primary material property of polymer melts that exhibit both viscous and elastic characteristics. Physically, the fluid model involves the viscous and viscoelastic models. The GNF (Generalized Newtonian Fluids) shear viscosity model is a classic viscous model. The GNF-X (eXtended GNF) model of the hybrid shear/extensional viscosity is recently developed by Tseng et al. (See, U.S. Pat. No. 10,710,285; the entirety of the above-mentioned publication is hereby incorporated by reference herein and made a part of this specification).

Figure 1:
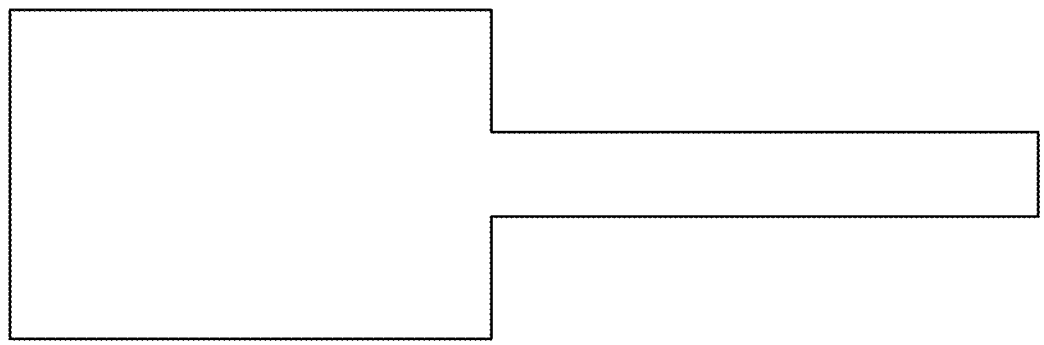
FIG. 1 shows a capillary geometry.
Figure 2:
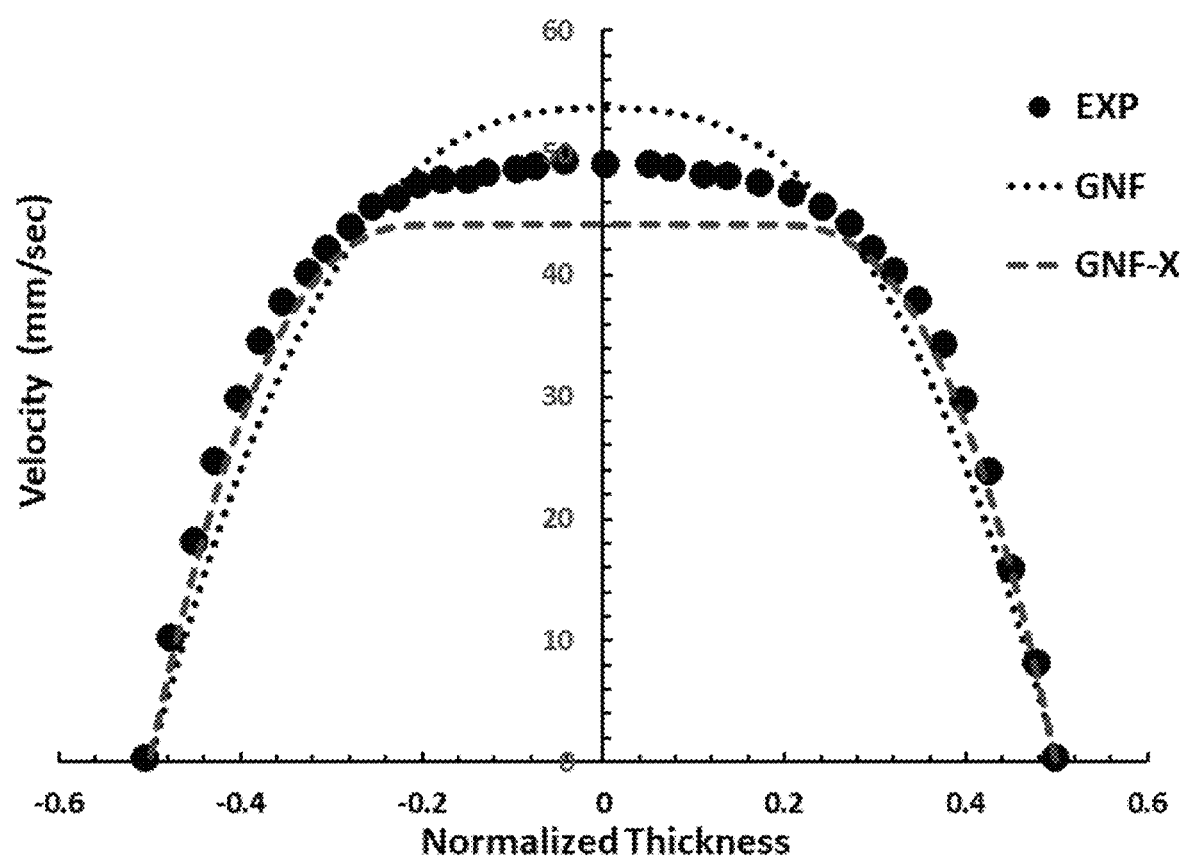
FIG. 2 shows a capillary velocity profile in FIG. 1.

The capillary flow, as shown in FIG. 1, in the contraction channel is basic in academic researches for the polymer rheology, as well as popular geometry for the industrial problems of polymer processing, such as injection and extrusion molding. It appears that there are rarely attempted for the viscous models to validate the capillary flow profile of polymer melt in the steady state and homogenous flows, as compared with the related experimental data. However, the viscous fluid model has not been unsatisfactory of the velocity profile, namely, the over-prediction of the GNF (Generalized Newtonian Fluids) shear viscosity model and the under-prediction of the GNF-X (eXtended GNF) model, as shown in FIG. 2, weighted shear/extensional viscosity.

Hence, this reason is obvious attributed to loss of elastic effect for the viscous models. Basically, all of the shear viscosity, extensional viscosity and elastic effect are complete to sufficiently describe the viscoelastic fluid characteristic. The GNF-X model possesses the shear viscosity and extensional viscosity in absence of elastic effect. Thus, the objective of the present innovation is to propose the elastic effect model improving the GNF-X model as the informed viscoelatsic (iVE) model, and then accurately predict the capillary velocity profile.

The actual flow of polymer melts is transient, non-Newtonian and non-isothermal, with frozen layers building up as the complex mixture flows through the mold cavity. The governing equations of the fluid mechanics include the equation of continuity, the equation of motion, and the equation of energy to describe the transient and non-isothermal flow motion are as follows (See, Bird RB, Wiest JM. Constitutive equations for polymeric liquids. Annu Rev Fluid Mech 1995; 27 169-193; the entirety of the above-mentioned publication is hereby incorporated by reference herein and made a part of this specification):

$$\frac{\partial \rho}{\partial t} + \nabla \cdot \rho u = 0 \quad (1)$$

$$\frac{\partial}{\partial t}(\rho u) + \nabla \cdot (\rho u u) = -\nabla P + \nabla \cdot \tau + \rho g \quad (2)$$

$$\rho C_P \left( \frac{\partial T}{\partial t} + u \cdot \nabla T \right) = \nabla \cdot (k \nabla T) + \tau : D \quad (3)$$

where $\rho$ is the density; u the velocity vector; t the time; T represents the extra stress tensor; $\nabla u$ represents the velocity gradient tensor; D represents the rare-of-deformation tensor (i.e., symmetric tensor of $\nabla u$); g represents the acceleration vector of gravity; P represents the pressure; $C_p$ represents the specific heat; T represents the temperature; k represents the thermal conductivity. The extra stress tensor $\tau$ is defined by the generalized Newtonian fluid (GNF) viscous model for polymer melts, as follows:

$$\tau = 2\eta_S(T, P, \dot{\gamma})D \quad (4)$$

In general, the Cross-William-Landel-Ferry (Cross-WLF) flow curve model has been used to describe the shear viscosity $\eta_S$ as a function of the temperature T, pressure P, and strain rate $\dot{\gamma}$.

Furthermore, the flow curves of shear viscosity dominate the flow behaviors of a variety of materials. Commonly, the well-known Cross-WLF model (See, Cross, M. M., "Relation between Viscoelasticity and Shear-Thinning Behaviour in Liquids," Rheol Acta 18 609-614 (1979); the entirety of the above-mentioned publication is hereby incorporated by reference herein and made a part of this specification) used in polymer rheology and processing simulations can describe complex viscosity behaviors, including viscosity varying with shear rate for the Cross model and the zero-shear-rate viscosity, depending on temperature and pressure for the WLF model, as follows:

$$\eta_S(\dot{\gamma}, T, P) = \frac{\eta_0(T, P)}{1 + \left(\frac{\eta_0 \dot{\gamma}}{\tau^*}\right)^{1-n}} \quad (5)$$

$$\eta_0(T, P) = D_1 \exp\left( \frac{-A_1(T - T_c)}{A_2 + (T - T_c)} \right) \quad (6)$$

-continued $$T_c = D_2 + D_3 P \quad (7)$$

$$A_2 = \tilde{A}_2 + D_3 P \quad (8)$$

where seven parameters are fit by related experimental data, including n, $\tau^*$, $A_1$, $\tilde{A}_2$, $D_1$, $D_2$ and $D_3$.

The extensional viscosity is always non-dimensionalized with the shear viscosity. This ratio Tr is called the Trouton ratio:

$$Tr = \frac{\eta_E}{\eta_S} \quad (9)$$

For isotropic Newtonian viscosity, the Trouton ratio ideally equals 3, 4, and 6 in the uniaxial, planar, and biaxial extension flows, respectively. In practice, it is difficult to directly model the extensional viscosity via a mathematical relationship. Sarkar and Gupta (See, Sarkar, D. and M. Gupta, "Further Investigation of the Effect of Elongational Viscosity on Entrance Flow," J Reinf Plast Compos 20 1473-1484 (2001); the entirety of the above-mentioned publication is hereby incorporated by reference herein and made a part of this specification) therefore provided the strain-rate dependence of the Trouton ratio function to determine the extensional viscosity:

$$Tr(\dot{\gamma}) = 3 + \delta \left[ 1 - \frac{1}{\sqrt{1 + (\lambda \dot{\gamma})^2}} \right] \quad (10)$$

$$\eta_E(\dot{\gamma}) = \eta_S(\dot{\gamma}) Tr(\dot{\gamma}) \quad (11)$$

where the parameters $\delta$ and $\lambda$ are fitted by experimental extension viscosity data. This model can complete the extension viscosity curve with low-strain-rate extension thickening. Based on the previous disclosure of Sarkar and Gupta, Tseng recently proposed a new Trouton ratio expression (See, Sarkar, D. and M. Gupta, "Further Investigation of the Effect of Elongational Viscosity on Entrance Flow," J Reinf Plast Compos 20 1473-1484 (2001); Tseng, H.-C., "A Revisitation of Generalized Newtonian Fluids," J Rheol 64 493-504 (2020); the entirety of the above-mentioned publication is hereby incorporated by reference herein and made a part of this specification):

$$Tr(\dot{\gamma}) = 3 + \frac{T_0}{[1 + (\lambda_T \dot{\gamma})^{-2}]^{n_T}} \quad (12)$$

where three parameters of $T_0$, $\lambda_T$, and $n_T$ are fitted by experimental extension viscosity data to describe the significant extension thinning and extension thickening characteristics. Moreover, Tseng et al. (See, U.S. Pat. No. 10,710,285; the entirety of the above-mentioned publication is hereby incorporated by reference herein and made a part of this specification) derived the weighted shear/extensional viscosity $\eta_W(\dot{\gamma})$, called the eXtended GNF (GNF-X) viscous model, as below:

$$\eta_W = (1 - W)\eta_S + W\eta_E \quad (13)$$

$$1 - W = \frac{\dot{\gamma}_S^2}{\dot{\gamma}_T^2} \quad (14)$$

-continued $$W = \frac{\dot{\gamma}_E^2}{\dot{\gamma}_T^2} \quad (15)$$

$$\dot{\gamma}_T^2 = \dot{\gamma}_S^2 + \dot{\gamma}_E^2 \quad (16)$$

where W is the weighting function; and E are the shear viscosity and extensional viscosity of the GNF model with respect to strain rates, respectively. When W=0, the GNF-X weighted viscosity returns to the GNF shear viscosity.

Viscoelasticity (VE) is a primary material property of polymer melts that exhibit both viscous and elastic characteristics. The elastic effect contains the fluid rotating and stretching motions. In the fluid mechanics, the vorticity tensor W and the deformation-rate tensor D are physically indicate the meaning of rotation and stretch, respectively. In addition, both tensors, D and W, are the symmetric and antisymmetric matrix of the velocity gradient tensor $\nabla v$, $$D = \frac{\nabla v + (\nabla v)^T}{2} \quad (17)$$

$$W = \frac{\nabla v - (\nabla v)^T}{2} \quad (18)$$

In the present innovation, the stress tensor $\tau$ is projected on the D and W that is considered as the elastic effect on the fluid. Thus, one can develop the elastic effect model of stress tensor $\tau_E$, as below:

$$\tau_E = 2W_i[(\tau \cdot W^*)_R + C_N(\tau \cdot D^*)_S] \quad (19)$$

$$D^* = D/\dot{\gamma} \quad (20)$$

$$W^* = W/\dot{\gamma} \quad (21)$$

$$(\tau \cdot W^*)_R = \frac{\tau \cdot W^* + W^{*T} \cdot \tau}{2} \quad (22)$$

$$(\tau \cdot D^*)_S = \frac{\tau \cdot D^* + D^* \cdot \tau}{2} \quad (23)$$

$$W_i(\dot{\gamma}) = \frac{W_0}{\left[1 + \left(\frac{\dot{\gamma}}{\dot{\gamma}_{CW}}\right)^{-2}\right]^{n_W}} \quad (24)$$

$$C_N(\dot{\gamma}) = 1 - 2\left[R_0 + \frac{0.5 - R_0}{\left[1 + \left(\frac{\dot{\gamma}}{\dot{\gamma}_{CR}}\right)^2\right]^{n_R}}\right] \quad (25)$$

where D* and W* are dimensionless tensors of the rate-of-deformation tensor D and the vorticity tensor W, respectively; $(\tau \cdot W^*)_R$ and $(\tau \cdot D^*)_S$ represent the rotating and stretching projection of the stress tensor, respectively; $W_i(\dot{\gamma})$ and $C_N(\dot{\gamma})$ are the Weissenberg-number and the normal-stress parameters, respectively; W0, $\dot{\gamma}_{CW}$, and $n_W$ are fit by the experimental data of the first normal stress difference (N1), as well as $R_0$, $\dot{\gamma}_{CR}$ and $n_R$ are fit by the experimental data of the minus-normal-stress-difference ratio (−N2/N1) wherein N2 is the second normal stress difference.

Therefore, the tensor $\tau_E$ can is coupled to the GNF-X model as below:

$$\tau = \tau_V^{GNF-X} + \tau_E \quad (26)$$

$$T_V^{GNF-X} = 2\eta_W D \quad (27)$$

$$\tau_E = 2W_i[(\tau \cdot W^*)_R + C_N(\tau \cdot D^*)_S] \quad (28)$$

This is defined as the informed viscoelastic (iVE) equation. Such an equation incorporates the shear and extension viscous contributions of the GNF-X term $\tau_V^{GNF-X}$, as well as the elastic-effects term $\tau_E$ containing the rotating and stretching deformation of the viscoelastic fluid element, $(\tau \cdot W^*)_R$ and $(\tau \cdot D)_S$. When Wi equals zero, the WMT-X viscoelastic model returns to the GNF-X viscous model. Finally, the iVE model is incorporated into the flowchart of Moldex3D.

Figure 3:
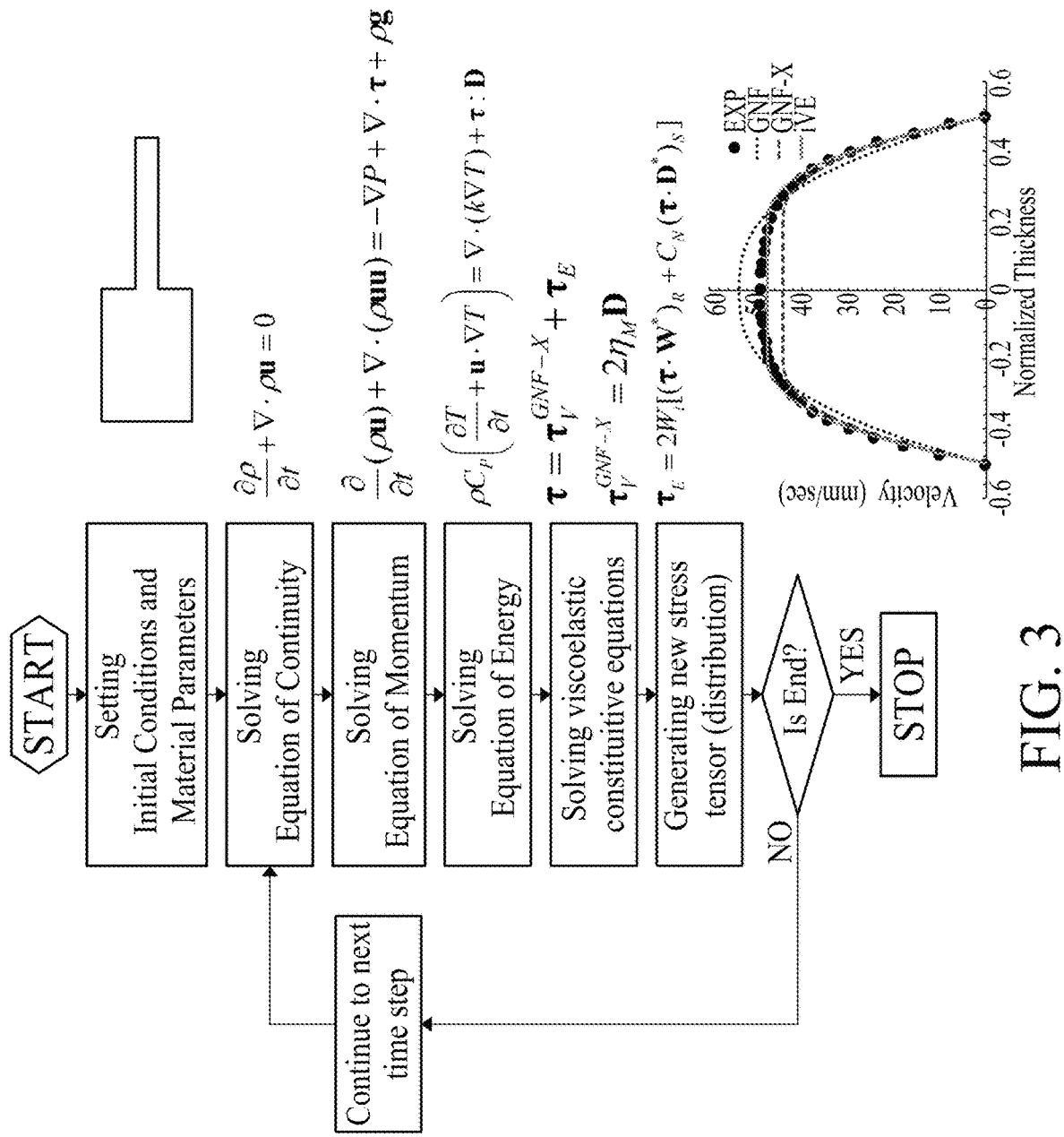
FIG. 3 is a flowchart showing an injection-molding simulation operation in accordance with some embodiments of the present disclosure.

FIG. 3 is a flowchart showing an injection-molding simulation operation in accordance with some embodiments of the present disclosure. Referring to FIG. 3, in injection-molding simulation operations, the governing equations of fluid mechanics that describe the transient flow behaviors are as follows:

$$\frac{\partial \rho}{\partial t} + \nabla \cdot \rho u = 0 \quad (29)$$

$$\frac{\partial}{\partial t}(\rho u) + \nabla \cdot (\rho u u) = \nabla \cdot \sigma + \rho g \quad (30)$$

$$\sigma = -PI + \tau \quad (31)$$

$$\rho C_P\left(\frac{\partial T}{\partial t} + v \cdot \nabla T\right) = \nabla \cdot (k \nabla T) + \eta_S \dot{\gamma}^2 \quad (32)$$

where $\rho$ represents density; u represents the velocity vector; t represents time; $\sigma$ represents the total stress tensor; T represents the extra stress tensor; $\nabla v$ represents the velocity gradient tensor; g represents the acceleration vector of gravity; P represents pressure; $C_p$ represents specific heat; T represents temperature; k represents thermal conductivity; $\eta_S$ represents shear viscosity; and $\dot{\gamma}$ represents the total strain rate.

Solving the governing equations (29)-(32) requires a transient state analysis, which can be performed numerically using a computer (See, for example, Rong-Yeu Chang and Wen-hsien Yang, "Numerical simulation of mold filling in injection molding using a three-dimensional finite volume approach," International Journal for Numerical Methods in Fluids Volume 37, Issue 2, pages 125-148, Sep. 30, 2001; the entirety of the above-mentioned publication is hereby incorporated by reference herein and made a part of this specification). During the transient state analysis, the process variables that change with time are not zero; i.e., the partial derivatives $$\left(\frac{\partial}{\partial t}\right)$$

in the governing equations (29)-(32) are not considered zero.

The true 3D Finite Volume Method (FVM) is employed due to its robustness and efficiency to solve the transient flow fields in a complex 3D geometrical article. In some embodiments of the present disclosure, the simulation flow in FIG. 3 can be implemented using commercial injection-molding simulation software, Moldex3D (CoreTech System Co. of Taiwan), to facilitate the orientation predictions of the molding resin.

Figure 4:
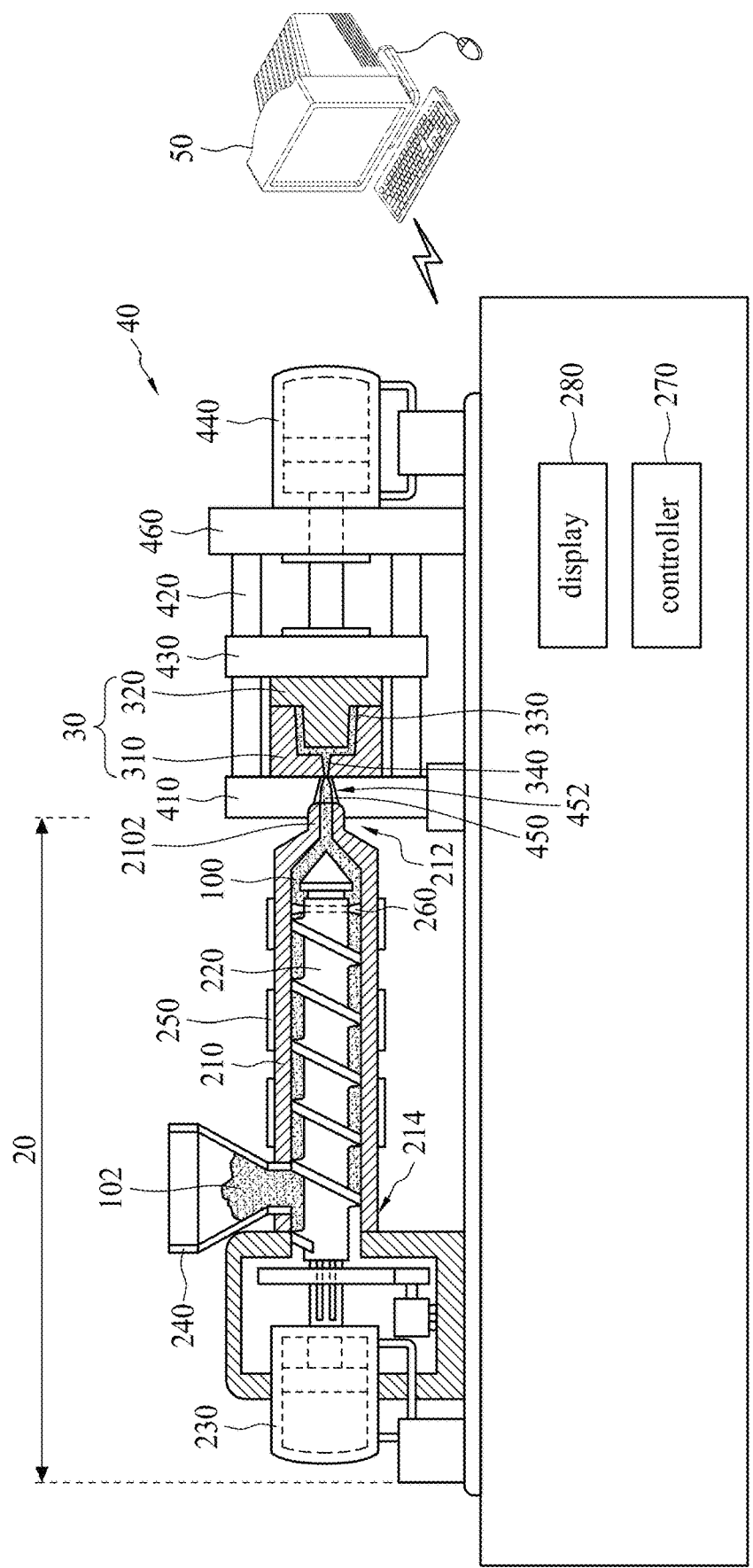
FIG. 4 is a schematic view of an injection-molding apparatus in accordance with some embodiments of the present disclosure.

FIG. 4 is a schematic view of an injection-molding apparatus 10 in accordance with some embodiments of the present disclosure. Referring to FIG. 4, the injection-molding apparatus 10 that can be used to carry out molding includes a molding machine 20, a mold 30, a clamping assembly 40 and a computer 50. The molding machine 20 includes a barrel 210 having a downstream end 212 connected to the mold 30. The mold 30 includes mold halves 310 and 320 to define a mold cavity 330 and a runner 340 in communication with the mold cavity 330.

The clamping assembly 40 is in operative connection with the mold 30 for clamping the mold halves 310 and 320. In some embodiments, the clamping assembly 40 includes a fixed plate 410, a plurality of tie bars 420 mounted on the fixed plate 410, and a moving plate 430 slidably engaged with the tie bars 420 and guided by a driving cylinder 440. The mold half 310 proximal to the barrel 210 is secured on the fixed plate 410, and the mold half 320 distal to the barrel 210 is secured on the moving plate 430 in any suitable manner, wherein the driving cylinder 440 drives the moving plate 430 to open or close the mold 30. In some embodiments, the barrel 210 includes a nozzle 2102 adapted to engage a sprue 450 in the fixed plate 410. In some embodiments, the sprue 450 is in communication with the runner 340 as the mold half 310 is assembled with the fixed plate 410. In some embodiments, the fixed plate 410 may be equipped with a sprue bushing 452 including the sprue 450 and receiving the nozzle 2102 during an injection time. A molding material 100 under pressure is delivered to the sprue bush 452 from the nozzle 2102 pressed tightly against the sprue bush 452 in order to deliver the molding material 100 to the sprue 450 during a filling stage of the injection time.

In some embodiments, the clamping assembly 40 further includes an ejector plate 460 mounted with at least one ejector pin (not shown), wherein the moving plate 430 is disposed between the fixed plate 410 and the ejector plate 460. In some embodiments, the ejector plate 460 is fixed on one of the plurality of tie bars 420. In some embodiments, the driving cylinder 440 penetrates the ejector plate 460 and directly connects to the moving plate 430 to open or close the mold 30. After the mold halves 310 and 320 are separated (i.e., the mold 30 is opened), a distance between the moving plate 430 and the ejector plate 460 is reduced, so the ejector pin can penetrate through the ejector plate 460 to push a molded product out of the mold 30.

A screw 220 is mounted for moving within the barrel and is operably connected, at an upstream end 214 opposite to the downstream end 212 of the barrel 210, to a driving motor 230. The molding machine 20 processes material, such as plastic granules 102, by feeding the material through a hopper 240 to the barrel 210 in order to make the material soft and force the molding material 100 into the mold 30 by the use of the screw 220, wherein the phase of the plastic granules 102 is changed from solid to liquid by at least one heater band 250 surrounding the barrel 210. In some embodiments, the molding machine 20 further includes a check valve 260 mounted on the screw 220, wherein the check valve 260 is in tight contact with the barrel 210 during the filling stage, and the check valve 260 is open for allowing the liquid material to flow to the downstream end 212 of the barrel 210 during a packing stage. In some embodiments, if the mold cavity 330 is almost filled with the molding material 100, a packing process proceeds. In some embodiments, the screw 220 rotates and moves toward the upstream end 214 of the barrel 210 during the packing stage.

The injection-molding apparatus 10 further includes a controller 270 for controlling and monitoring the real-time functions of the molding machine 20, and a display 280 for displaying data related to the performance and operation of the molding machine 20 to on-site technicians. In some embodiments, the display 280 is further configured to accept input data from the on-site technicians. In other words, the display 280 is provided with a communications link directly with the controller 270 to provide real-time control of the molding machine 20 by the on-site technicians particularly where the on-site technicians' intervention is required.

In some embodiments, the injection-molding apparatus 10 can further include operation interface communication links among the controller 270, the display 280 and peripheral devices, and a program sequence of operation which allows the operation interface to monitor diagnostic functions of the controller 270 and the molding machine 20, trigger sound and/or light alarms regarding conditions of the molding machine 20, receive performance data from the molding machine 20, and receive input data from the display 280.

The computer 50 is associated with the molding machine 20 and is configured to execute CAE simulation software and transmit at least one simulation result to the controller 270 through a connection such as a hard wire connection or a wireless coupling. In some embodiments, the computer 50 includes a standardized operation system capable of running general-purpose application software for assisting with the analysis of process performance data and for communicating with the controller 270 and the display 280 via communication ports of each.

Figure 5:
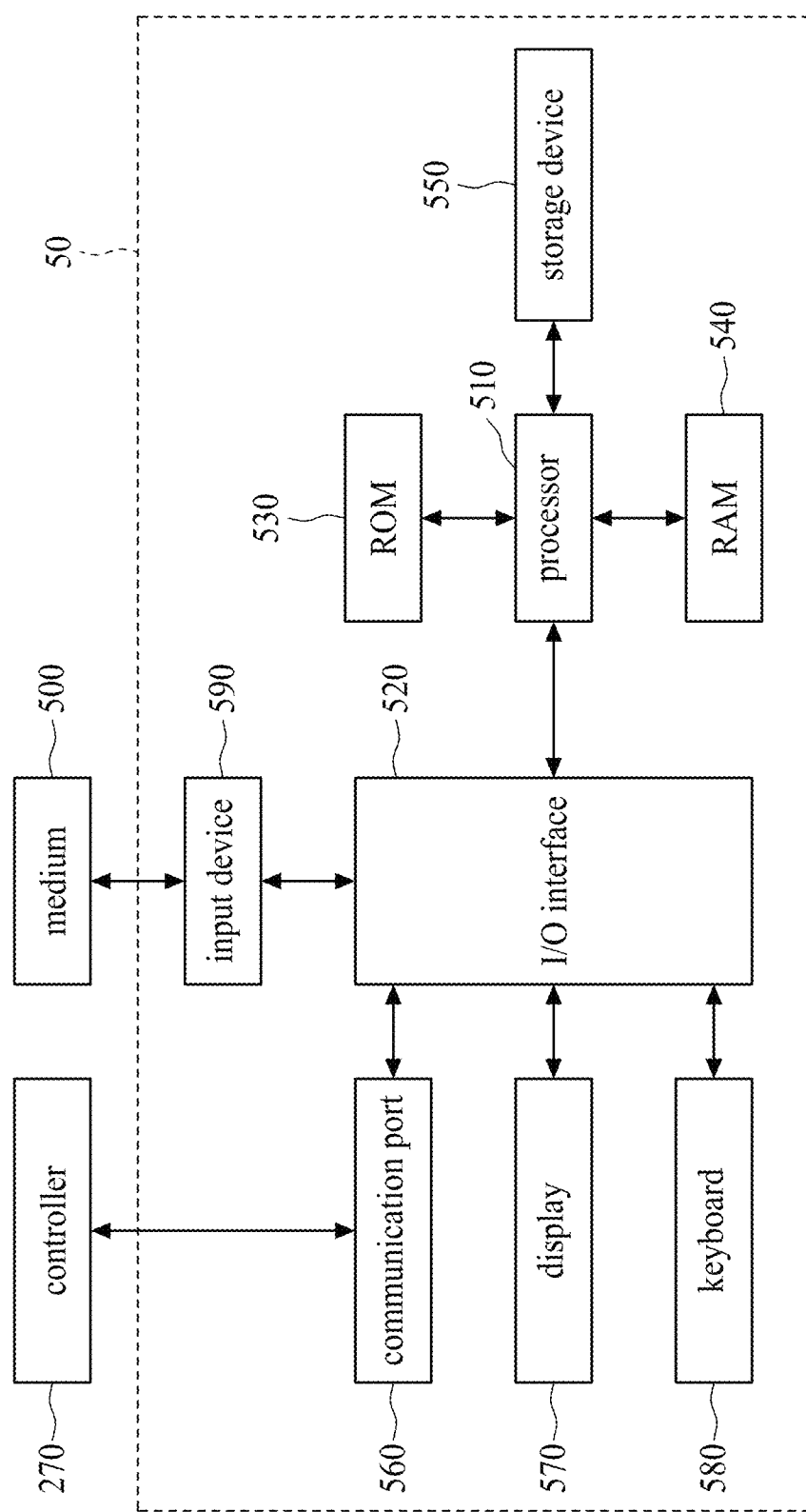
FIG. 5 is a functional block diagram of the computer in FIG. 4.

FIG. 5 is a functional block diagram of the computer 50 in FIG. 4. Referring to FIG. 5, the computer 50 includes a processing module 510 such as a processor adapted to perform a computer-implemented simulation method for use in injection molding, an input/output (I/O) interface 520 electrically coupled to the processing module 510, and memories, which may include a read-only memory (ROM) 530, a random access memory (RAM) 540 and a storage device 550. The ROM 530, the RAM 540 and the storage device 550 are communicatively coupled to the processing module 510.

The computer 50 further includes a communication port 560 associated with the controller 270 of the molding machine 20. The computer 50 may further include one or more accompanying input/output devices including a display 570, a keyboard 580 and one or more other input devices 590. The input devices 590 may include a card reader, an optical disk drive or any other device that allows the computer 50 to receive input from the on-site technicians. In some embodiments, the input devices 590 are configured to input computer instructions (software algorithms) stored in a non-transitory computer-readable medium 500, and the processing module 510 is configured to execute operations for performing a computer-implemented injection-molding simulation method according to the computer instructions. In some embodiments, the processing module 510 reads software algorithms from the other input device 590 or the storage device 550, executes the calculation steps, and stores the calculated result in the RAM 540.

In the present disclosure, the subroutine to calculate the principal shear rate and the principal extension rate has been implemented in commercial injection-molding simulation software, Moldex3D (CoreTech System Co. of Taiwan). Flows in injection molding are dominated by shear flows. In practice, extension flows are encountered, especially the sudden contraction flow. Such geometry is usually found in injection molding for polymer melts flowing through gate and nozzle regions into a mold cavity. A planar contraction flow simulation was performed via Moldex3D. In order to show the extension effect, a new extension indicator can be defined as follows:

$$EF = \frac{(\dot{\gamma}_E^*)^2}{(\dot{\gamma}_S^*)^2 + (\dot{\gamma}_E^*)^2} \tag{33}$$

Figure 6:
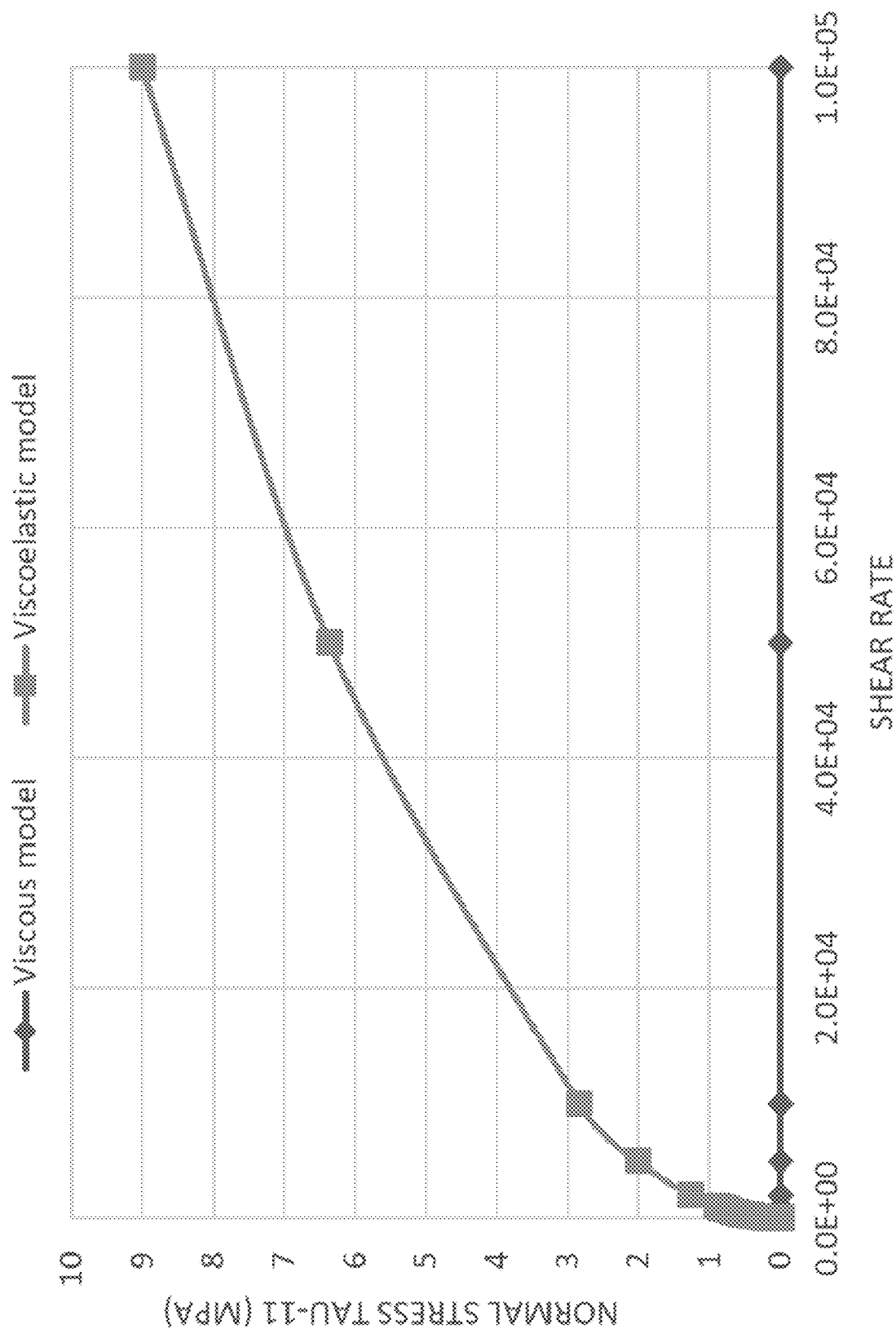
FIG. 6 illustrates the relationship between the elastic effect of the stress distribution and the shear rate of the molding resin for the viscous model and the viscoelastic model, respectively, in accordance with some embodiments of the present disclosure.

FIG. 6 illustrates the relationship between the elastic effect of the stress distribution and the shear rate of the molding resin for the viscous model and the viscoelastic model, respectively. In the chart, the normal stress ($\tau_{11}$, the elastic component of the stress tensor) corresponds to the elastic effect ($\tau_E$) of the stress distribution. As shown in FIG. 6, the normal stress ($\tau_{11}$) in the viscous model is zero. In contrast, the normal stress ($\tau_{11}$) in the viscoelastic model is not zero; instead, the normal stress ($\tau_{11}$) increases substantially with the shear rate.

A survey of the literature on the rheological theories found that few studies discuss the accuracy of constitutive equations in regard to the capillary velocity profile of contraction flows, especially for polymer melts. From experimental investigation, Schmidt et al. (See, Schmidt, M., E. Wassner, and H. Minstedt, "Setup and Test of a Laser Doppler Velocimeter for Investigations of Flow Behaviour of Polymer Melts," Mech Time-Depend Mater 3 371-393 (1999); the entirety of the above-mentioned publication is hereby incorporated by reference herein and made a part of this specification) adopted a Laser Doppler Velocimeter to measure the capillary velocity profile of the 1:14 contraction flow for LDPE melt at 150° C. In particular, the relatively high apparent shear rate of 227 s-1 is given. Thus, one can use the Moldex3D software to simulate such a practical contraction flow of Schmidt et al.

Figure 7:
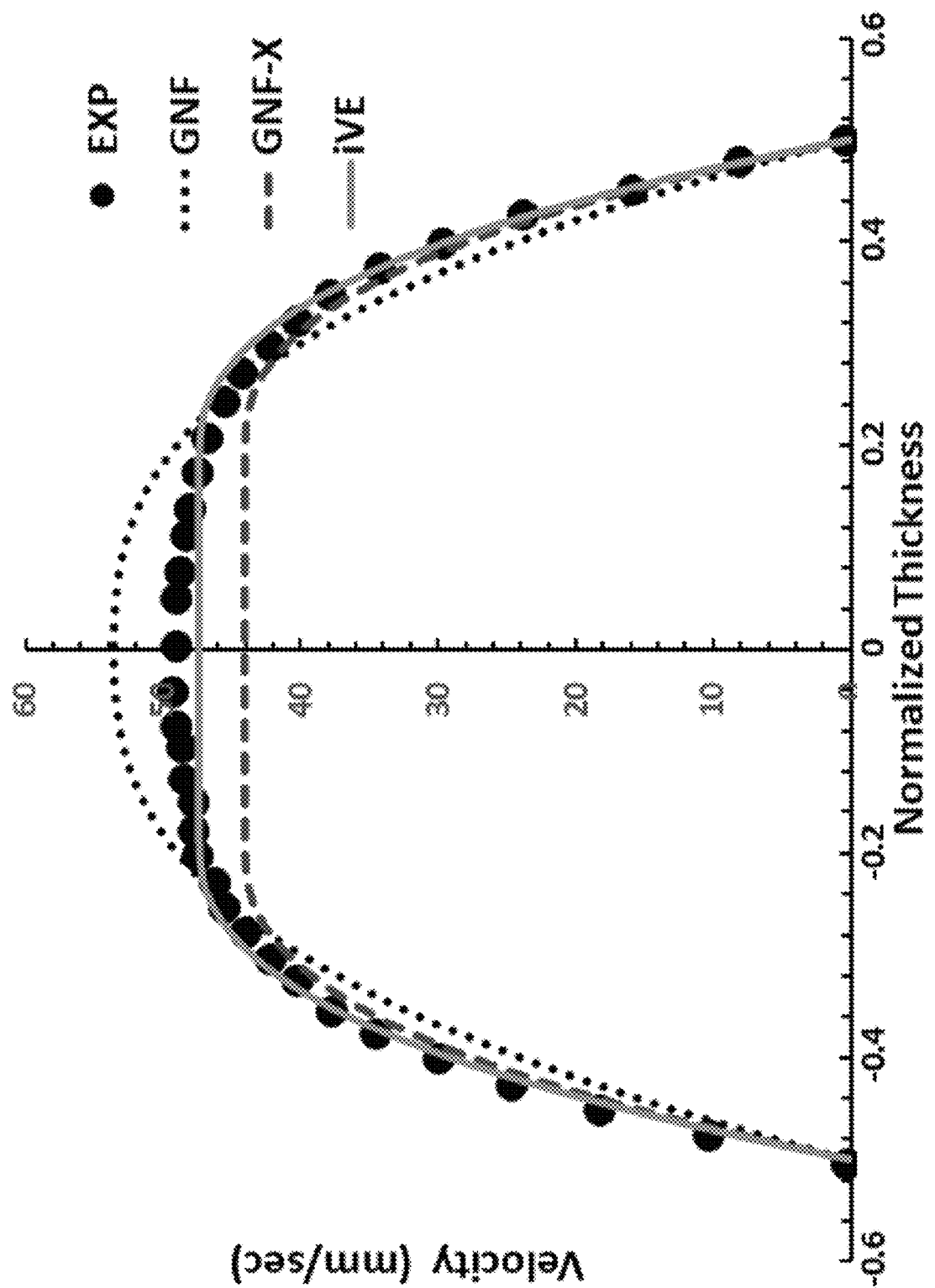
FIG. 7 shows the capillary velocity profiles for different models: GNF, GNF-X, and iVE, in accordance with some embodiments of the present disclosure.

FIG. 7 shows the capillary velocity profiles for different models: GNF, GNF-X, and iVE, wherein the experimental data are sourced from the previous work of Schmidt et al. As shown in FIG. 7, the over-prediction of the parabolic profile was found in the GNF shear viscosity model. In the absence of an elastic effect, the GNF-X model attached with the weighted shear/extensional viscosity exhibits under-prediction of the plug profile. Significantly, the iVE curve of the present disclosure pretty well matches the experimental data because such a model completely incorporates the shear viscosity and extensional viscosity, as well as the elastic effects of the first and second normal stress differences.

In addition, Table 1 shows the maximum value of the velocity profile for the different models; this result also confirms the importance of the elastic effect in attaining accurate quantitative predictions. Surely, the iVE model of the present disclosure is validated to provide the elastic effect on flow behaviors.

TABLE 1

Percent error of maximum velocity for differential constitutive models.

| Model | Maximum velocity (mm/s) | Percent error (%) |
|---|---|---|
| Experimental value | 48.5 | — |
| GNF | 53.6 | 10.5 |
| GNFX | 43.0 | −11.3 |
| iVE | 47.5 | −2.1 |

The present disclosure provides a molding system for preparing an injection-molded article, comprising a molding machine; a mold disposed on the molding machine and having a mold cavity for being filled with a molding resin; a processing module configured to generate a stress distribution of the molding resin in the mold cavity based on a molding condition for the molding machine, wherein the stress distribution of the molding resin is generated by taking into consideration an elastic effect of the molding resin; and a controller coupled to the processing module and configured to control the molding machine with the molding condition using the generated stress distribution of the molding resin to perform an actual molding process for preparing the injection-molded article.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. A molding system for preparing an injection-molded article, comprising:
    a molding machine, including a barrel, a screw mounted for moving within the barrel, and a driving motor driving the screw to move a molding resin;
    a mold disposed on the molding machine and connected to the barrel of the molding machine to receive the molding resin, and having a mold cavity for being filled with the molding resin;
    a processing module simulating a stress distribution of the molding resin in the mold cavity based on a molding condition for the molding machine, wherein the stress distribution of the molding resin is simulated by taking into consideration an elastic effect of the molding resin; and
    a controller operably communicating and coupled to the processing module to receive the simulated stress distribution of the molding resin and to control the driving motor of the molding machine with the molding condition to move the screw to transfer the molding resin according to the simulated stress distribution of the molding resin to perform an actual molding process for preparing the injection-molded article;
    wherein the molding resin comprises a plurality of polymer chains, and the elastic effect of the molding resin is integrally generated by a deformation and a rotation of polymer chains; wherein the elastic effect of the stress distribution of the molding resin is represented using an expression:

$$\tau_E = 2W_i[(\tau \cdot W^*)_R + C_N(\tau \cdot D^*)_S]$$

$$D^* = D/\dot{\gamma}$$

$$W^* = W/\dot{\gamma}$$

-continued $$(\tau \cdot W^*)_R = \frac{\tau \cdot W^* + W^{*T} \cdot \tau}{2}$$

$$(\tau \cdot D^*)_S = \frac{\tau \cdot D^* + D^* \cdot \tau}{2}$$

$$W_i(\dot{\gamma}) = \frac{W_0}{\left[1 + \left(\frac{\dot{\gamma}}{\dot{\gamma}_{CW}}\right)^{-2}\right]^{n_W}}$$

$$C_N(\dot{\gamma}) = 1 - 2\left[R_0 + \frac{0.5 - R_0}{\left[1 + \left(\frac{\dot{\gamma}}{\dot{\gamma}_{CR}}\right)^{2}\right]^{n_R}}\right]$$

where $\tau$ represents the stress distribution of the molding resin; $\tau_E$ represents an elastic portion of the stress distribution of the molding resin; D and W represents a rate-of-deformation distribution and a vorticity distribution of the molding resin, respectively; $\dot{\gamma}$ represents a total strain rate distribution of the molding resin; $(\tau \cdot W^*)_R$ and $(\tau \cdot D^*)_S$ represent a rotating and a stretching of the molding resin, respectively; $W_i(\dot{\gamma})$ and $C_N(\dot{\gamma})$ represents a viscoelastic property and a normal-stress parameter of the molding resin, respectively.

2. The molding system of claim 1, wherein the viscoelastic property of the molding resin is represented using an expression:

$$W_i(\dot{\gamma}) = \frac{W_0}{\left[1 + \left(\frac{\dot{\gamma}}{\dot{\gamma}_{CW}}\right)^{-2}\right]^{n_W}}$$

$$C_N(\dot{\gamma}) = 1 - 2\left[R_0 + \frac{0.5 - R_0}{\left[1 + \left(\frac{\dot{\gamma}}{\dot{\gamma}_{CR}}\right)^{2}\right]^{n_R}}\right]$$

where $W_0$, $\dot{\gamma}_{CW}$, and $n_W$ are fit by the experimental data of the first normal stress difference; $R_0$, $\dot{\gamma}_{CR}$, and $n_R$ are fit by the experimental data of the minus ratio of the second normal stress difference to the first normal stress difference.

3. The molding system of claim 2, wherein the processing module simulates the stress distribution of the molding resin by taking into consideration a mixed anisotropic viscosity distribution of the molding resin.

4. The molding system of claim 3, wherein the stress distribution of the molding resin is represented using an expression:

$$\tau = \tau_V^{GNF-X} + \tau_E$$

$$\tau_V^{GNF-X} = 2\eta_M D$$

$$\tau_E = 2W_i[(\tau \cdot W^*)_R + C_N(\tau \cdot D^*)_S]$$

where $\tau_V^{GNF-X}$ represents a mixed anisotropic stress distribution of the molding resin, and $\eta_M$ represents a mixed anisotropic viscosity distribution of the molding resin.

5. The molding system of claim 4, wherein the mixed anisotropic viscosity distribution of the molding resin is simulated by taking into consideration an extension rate distribution and a shear rate distribution of the molding resin, and the extension rate distribution is simulated by an interaction of the plurality of polymer chains.

6. The molding system of claim 5, wherein the mixed anisotropic viscosity distribution of the molding resin is represented using an expression:

$$\eta_M = \eta_S\left[1 + (R_{TR})\frac{(\dot{\gamma}_E^*)^2}{(\dot{\gamma})^2}\right]$$

$$R_{TR}(\dot{\gamma}) = \frac{\eta_E}{\eta_S} = N_1 + \frac{N_2}{[1 + (\lambda\dot{\gamma})^{n_1}]^{n_2}}$$

$$\dot{\gamma}^2 = (\dot{\gamma}_S^*)^2 + (\dot{\gamma}_E^*)^2$$

where $\eta_M$ represents the mixed anisotropic viscosity distribution, $\eta_S$ represents a shear viscosity distribution, $\eta_E$ represents an extension viscosity distribution, N1, N2, n1, n2, and 2 are constants, $\dot{\gamma}^*_S$ represents the shear rate distribution of the molding resin, and $\dot{\gamma}^*_E$ represents the extension rate distribution of the molding resin.

7. The molding system of claim 5, wherein the processing module is simulates the extension rate distribution and the shear rate distribution of the molding resin based in part on consideration of a velocity distribution of the molding resin in the mold cavity.

8. The molding system of claim 7, wherein the processing module simulates the extension rate distribution and the shear rate distribution of the molding resin in a principal flow streamline coordinate system, and simulates the velocity distribution of the molding resin in the mold cavity in a Cartesian coordinate system.

9. The molding system of claim 8, wherein the processing module is simulates a rate-of-deformation distribution of the molding resin in the Cartesian coordinate system based in part on consideration of the velocity distribution due to a geometry variation of the mold cavity.

10. The molding system of claim 9, wherein the processing module is transforms the rate-of-deformation distribution of the molding resin in the Cartesian coordinate system into a rate-of-deformation distribution of the molding resin in the principal flow streamline coordinate system.

11. The molding system of claim 10, wherein the rate-of-deformation distribution of the molding resin in the Cartesian coordinate system is represented by an expression:

$$D = \begin{bmatrix} d_{11} & d_{12} & d_{13} \\ d_{12} & d_{22} & d_{23} \\ d_{13} & d_{23} & d_{33} \end{bmatrix}$$

wherein the processing module simulates the rate-of-deformation distribution of the molding resin in the principal flow streamline coordinate system by an expression:

$$D^* = RDR^T = \begin{bmatrix} d_{11}^* & d_{12}^* & d_{13}^* \\ d_{12}^* & d_{22}^* & d_{23}^* \\ d_{13}^* & d_{23}^* & d_{33}^* \end{bmatrix}$$

where R and $R^T$ represent coordinate transfer matrixes represented by an expression:

$$R = \begin{bmatrix} t \\ n \\ b \end{bmatrix}$$

$$RR^T = R^T R = I = \begin{bmatrix} 1 & 0 & 0 \\ 0 & 1 & 0 \\ 0 & 0 & 1 \end{bmatrix}$$

where t is a unit tangent vector, n is a unit normal vector, and b is a unit bi-normal vector.

12. The molding system of claim 11, wherein the unit tangent vector t, the unit normal vector n, and the unit bi-normal vector b are represented by an expression:

$$t = \frac{v}{|v|}$$

$$n = \frac{dv/ds}{|dv/ds|}$$

$$b = t \times n$$

where v is a flow velocity vector indicating the tangent direction of the flow line, and dv/ds is a direction of velocity changes along the arc of the flow line.

13. The molding system of claim 12, wherein the processing module is divides the rate-of-deformation distribution of the molding resin in the principal flow streamline coordinate system into the extension rate distribution and the shear rate distribution of the molding resin represented by an expression:

$$D^* = S^* + E^*$$

$$S^* = \begin{bmatrix} 0 & d_{12}^* & d_{13}^* \\ d_{12}^* & 0 & d_{23}^* \\ d_{13}^* & d_{23}^* & 0 \end{bmatrix}$$

$$E^* = \begin{bmatrix} d_{11}^* & 0 & 0 \\ 0 & d_{22}^* & 0 \\ 0 & 0 & d_{33}^* \end{bmatrix}$$

$$\dot{\gamma}_S^* = \sqrt{2S^* : S^*}$$

$$\dot{\gamma}_E^* = *\sqrt{2E^* : E^*}$$

$$\dot{\gamma}^2 = (\dot{\gamma}_S^*)^2 + (\dot{\gamma}_E^*)^2$$

where $\dot{\gamma}$ represents a total strain rate distribution of the molding resin, $\dot{\gamma}^*_S$ represents the shear rate distribution, and $\dot{\gamma}^*_E$ represents the extension rate distribution.

14. The molding system of claim 13, wherein the processing module is generates an extension fraction (EF) indicator represented by an expression:

$$EF = \frac{(\dot{\gamma}_E^*)^2 *}{(\dot{\gamma}_S^*)^2 + (\dot{\gamma}_E^*)^2}$$

15. The molding system of claim 14, wherein the processing module is simulates the extension rate distribution and the shear rate distribution of the molding resin based in part on consideration of a rate-of-deformation distribution of the molding resin due to the geometry variation of the mold cavity.

* * * * *